United States Patent
De Silvio et al.

(10) Patent No.: US 8,163,097 B2
(45) Date of Patent: Apr. 24, 2012

(54) METHOD FOR CONTROLLING THE HORIZONTAL BRUSH OF A VEHICLE WASHING SYSTEM

(75) Inventors: Marcelo Elvio De Silvio, Vicenza (IT); Maurizio Signore, Altavilla Vicentina (IT)

(73) Assignee: Ceccato S.p.A. (IT)

( * ) Notice: Subject to any disclaimer, the term of this patent is extended or adjusted under 35 U.S.C. 154(b) by 367 days.

(21) Appl. No.: 12/124,656

(22) Filed: May 21, 2008

(65) Prior Publication Data

US 2008/0300724 A1  Dec. 4, 2008

(30) Foreign Application Priority Data

May 23, 2007 (IT) .............................. MI2007A1040

(51) Int. Cl.
B08B 7/04 (2006.01)
B08B 1/02 (2006.01)
B08B 1/04 (2006.01)
G05B 15/00 (2006.01)

(52) U.S. Cl. .............. 134/18; 134/6; 134/42; 134/56 R; 134/123; 700/28; 700/262

(58) Field of Classification Search ................ 134/6, 18, 134/42, 56 R, 123
See application file for complete search history.

(56) References Cited

U.S. PATENT DOCUMENTS

| 5,093,951 A | 3/1992 | Smith et al. |
| 6,709,530 B1 * | 3/2004 | Dietsch et al. ................. 134/18 |
| 7,219,385 B1 | 5/2007 | Rietsch, Jr. |

FOREIGN PATENT DOCUMENTS

| JP | 2006312333 A * | 11/2006 |
| WO | WO 2007/048568 A1 | 5/2007 |
| WO | WO 2007048568 A1 * | 5/2007 |

OTHER PUBLICATIONS

Machine Translation: JP 2006-312333 to Yoshikawa, Nov. 2006.*
European Search Report for EP Application No. 08009327.1; mailed Dec. 11, 2009; 3 pages.

* cited by examiner

Primary Examiner — Michael Kornakov
Assistant Examiner — Natasha Campbell
(74) Attorney, Agent, or Firm — Hiscock & Barclay, LLP

(57) ABSTRACT

The method for controlling the movement of the horizontal brush of a vehicle washing system, provides for a first and a second vector velocity control mode of the brush and an alternating logic between the first and the second control mode, the first control mode being based on the control of the absorption current of the rotation motor of the brush, the second control mode being based on the geometric limitation of the plunge of the brush.

11 Claims, 3 Drawing Sheets

METHOD FOR CONTROLLING THE HORIZONTAL BRUSH OF A VEHICLE WASHING SYSTEM

FIELD OF THE INVENTION

The present invention refers to a method for controlling the horizontal brush of a vehicle washing system.

BACKGROUND OF THE INVENTION

The system for controlling the horizontal brush in the roll-over units or tunnel washing systems, has the task of moving the same along the entire profile of the vehicle maintaining a determined travel velocity and regulating the contact between the bristles and the bodywork in the best way possible.

Regardless of the travel speed, in order to have the ideal performances the pressure exerted by the bristles onto the surface must be uniform on all the points of contact and for the entire length of the longitudinal profile of the vehicle.

For proper washing with a suitable contact and the minimum risk of damage, the pressure of the bristles on the bodywork must be comprised between fixed minimum and maximum values.

Therefore, all the known control systems are based on the direct or indirect reading of the contact pressure.

A serious drawback is encountered when the vehicle to be washed has such an irregular surface to hinder the control, at certain points, from obtaining an accurate calculation of this fundamental parameter.

It is known that the control systems based on reading the absorption of the brush rotation motor operate on the total force obtained from the sum of the forces applied on all the points of the contact surface.

Regarding the regular and smooth surfaces it can be argued that the absorption current is approximately proportional to the total contact area of the brush against the vehicle. This surface can be interpreted as a rectangle of the same width as the bodywork at the point of contact and of a length proportional to the plunge. Given that the control attempts maintain the absorption current constant while the brush follows the profile of the vehicle, what occurs is that the plunge is modified in a manner inversely proportional to the width of the of the contact surface at all points. In other words the smaller the width the greater the plunge and, vice versa, the greater the width the smaller the plunge.

This situation divides types of vehicles in two categories: safe vehicles with regular surfaces, usually vehicles with closed bodyworks and without projecting accessories, for which the variation of the width is restricted and the plunge difference obtained is usually tolerable; and potentially risky vehicles with an irregular surface, usually vehicles with parts of the bodywork open such as pick-ups with an open rear an/or with roll bars, vehicles with ski boxes or other boxes fixed on the roof, off-road vehicles with spare wheels, vehicles with particular thin projections such as lights etc, which require special solutions from time to time.

For example, there is a special solution for vehicles of the pick-up type which prevents the brush from lowering onto the rear part where, possibly, critical situations might occur. For cleaning cycles which start from the rear part during the first travel forward, the brush moves only upwards, that is once it reaches the maximum height it remains at that position up to the end of the vehicle, while during the second travel backwards the brush starts from a low position at the rear moving only upwards and once it reaches the point where it had left the surface in the previous pass, the downwards movement is enabled. On the contrary, if the washing cycle starts from the rear part of the vehicle during the first travel backwards, the brush starts at a low position at the rear moving only upwards and once it reaches a preset distance from the front of the vehicle, the downward movement is enabled.

The drawbacks of this type of control lie: first and foremost in the fact that it does not consider the projections on the front or on the roof of the vehicle, for example spare wheels on the bonnet, ski-boxes, lights etc; secondly, in the fact that some projecting parts such as bars on the rear part of the vehicle or the absence of the rear door of a pick-up might lead to damages on the vehicle or the blocking of the system due to emergency; thirdly in the fact that it does not have a universal use in that it cannot be used on the other vehicles (vehicles with a regular profile etc) given that, during the forward travel it would not wash the entire rear from the roof to the bumpers, and hence, there arises the need to identify the pick-ups before selecting the washing programme; and fourthly, in the fact that the pick-ups cannot be identified in an accurate manner through automatic means due to the danger of causing damage, thus the selection is performed manually by the client.

SUMMARY OF THE INVENTION

Therefore, the technical task at the basis of the invention is that of providing a method for controlling the horizontal brush in the vehicle washing systems, capable of eliminating the technical drawbacks observed in the known art.

Within this technical task, an objective of the present invention is that of providing a method for controlling the horizontal brush in the vehicle washing systems capable of allowing proper washing with a suitable contact between the brush and the vehicle without risks of damage as well as also being useable universally with the same ideal performances regardless of the profile of the vehicle to be subjected to washing.

The technical task, as well as this and other objectives according to the present invention are attained by providing a method for controlling the horizontal brush in the vehicle washing systems described herein.

Furthermore, other characteristics of the invention are defined herein.

BRIEF DESCRIPTION OF THE DRAWINGS

Further characteristics and advantages of the invention shall be clearer from the description of a preferred but not exclusive embodiment of the method for controlling the horizontal brush in the vehicle washing systems according to the invention illustrated for indicative and non-limiting purposes in the attached drawings wherein.

DETAILED DESCRIPTION

The method for controlling the movement of the horizontal brush 1 of a vehicle washing system for example of rollover type or of the tunnel type, provides for a first and a second control mode of the vector velocity of brush 1 and an alternating logic between the first and the second control mode.

The first control mode is based on the control of the absorption current of the rotation motor of the brush 1 while the second control mode is based on the geometric limitation of the plunge of the brush 1 on the vehicle 2 to be washed.

Figure 5:
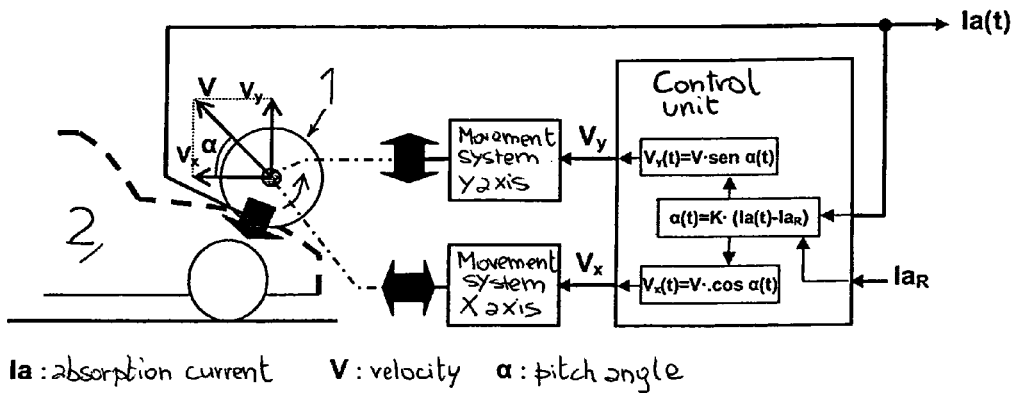
FIG. 5 shows the vector movement of the brush with the control of the absorption current, according to the present invention.
Figure 6:
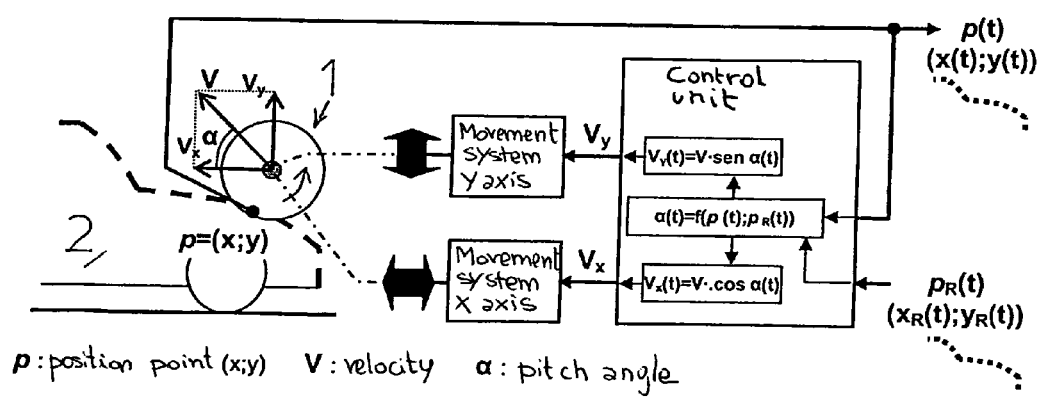
FIG. 6 shows the vector movement of the brush with the control of the brush plunge, according to the present invention.

In particular the first control mode is illustrated in FIG. 5 and it is exhaustively described in the patent application no PCT/EP2006/010219 owned by the present Applicant. In brief, the first control mode consists in setting an ideal reference value for the plunge of the brush 1 on the vehicle 2, corresponding to which is a reference absorption current value $Ia_r$, detecting the actual plunge level corresponding to an actual absorption current Ia and, when there is a mismatch between the ideal and the actual plunge value (that is between Ia and $Ia_r$) modifying the relative movement velocity between the brush 1 and the vehicle 2 to eliminate such mismatch. The brush 1 has a vertical movement system according to the axis indicated with Y, and a horizontal movement system, according to the axis indicated with X. Instead of controlling the vertical Vy and the horizontal Vx components of the velocity vector V independently, it is preferably provided for controlling the direction of velocity vector directly in such a manner to maintain it tangent to the profile of the vehicle at all points and guarantee a uniform plunge level, maintaining the modulus V at a constant value. The physical variables describing the system in an exhaustive system are:

Vx=Vx(t), component along the X axis of the velocity vector V,
as a function of time t;
Vy=Vy(t), component along the Y axis of the velocity vector V, as a function of time t;
V=V(t), modulus of the velocity vector V as a function of time t;
α=α(t) pitch angle of the vector V, as a function of time t;
Ia=Ia (t)
$Ia_r$=reference absorption current
K=Constant The second control mode is illustrated in FIG. 6. The second control mode consists in acquiring the profile of the vehicle to be washed and, starting from the profile of the vehicle thus acquired, processing a gauge profile for geometric limitation of the plunge of the brush on the vehicle over the entire profile covered by the brush. In this second control mode, the control parameter (in the first control mode the control parameter is $Ia_r$) becomes the sequence of memorised points of the gauge profile and the comparison one becomes the point actually reached at any time (in the first control mode the comparison parameter is Ia). Also in this case, when there is a position mismatch between the point reached and the memorised point provided by the gauge profile, the velocity vector of the relative movement between the brush 1 and the vehicle 2 is modified in such a manner to compensate such mismatch. The physical variables describing the system in an exhaustive manner are:

Vx=Vx(t), component along the X axis of the velocity vector V, as a function of time t;
Vy=Vy(t), component along the Y axis of the velocity vector V, as a function of time t;
V=V(t), modulus of the velocity vector V, as a function of the time t;
P(t)=(x(t), y(t)), instantaneous position of plunge
$P_r(t)=(x_r(t), y_r(t))$=instantaneous position of the gauge profile
$\alpha(t)=f(p(t); P_r(t))$, the function linking the pitch angle of the velocity vector V to the instantaneous values of p(t) and $p_r(t)$ Therefore, the control system involves an alternation between the two modes of operation, a first mode "for absorbing" and a second mode "for obtaining a gauge profile".

The alternating logic provides for switching from the first mode to the second mode when the plunge of the brush exceeds the level provided for by the gauge profile, and the switching from the second mode to the first mode when the absorption current reaches the minimum threshold value.

In order to do this, during the control section performed through the first control mode, the control unit checks the position of the brush with respect to the gauge profile, while during the control section through the second control mode, the control unit checks the current absorption value.

The acquisition of the profile of the vehicle consists in acquiring the profile of the longitudinal overall dimension of the vehicle considering the entire width of the vehicle itself.

It is important to point out that the profile required for this control is, absolutely, the profile of maximum overall longitudinal dimension of the vehicle, considering the entire length of the same. A profile read only on one plane (for example with a vertical or longitudinal plane, derived from a laser reading) is not required. On the contrary required is a reading capable of integrating the maximum projections on the width, that is, reading laterally and not vertically. Therefore, a reading performed by means of pairs of photocells arranged horizontally on both sides of the moveable washing structure is preferred.

Figure 1:
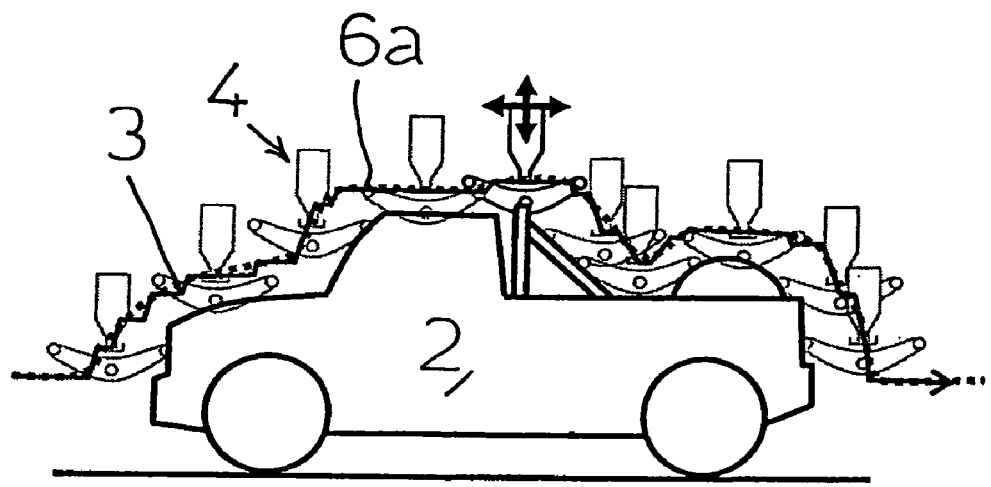
FIG. 1 schematically shows a vehicle profile detection system with the drying nozzle of the washing system, according to a first embodiment of the invention.

Referring to FIG. 1, the detection of the profile 3 of the vehicle 2 to be washed is obtained by copying by means of photocells performed by the horizontal drying nozzle 4.

The horizontal nozzle 4 also comprises the softener supplying device and the high pressure. Use of washing cycles starting with a pass of this product is becoming more and more common, especially in case of the self-service operation. Therefore, memorising the profile of the vehicle is obvious at this step.

For cases where the operation starts with foam pass, simultaneous performance of the copying by means of the nozzle (without any product being dispensed) is provided for due to the fact that the devices do not interfere with each other and that the foaming velocity as well as the sequence of colours (referring to levels and not times) are compatible with the movements required for said copying.

Figure 2:
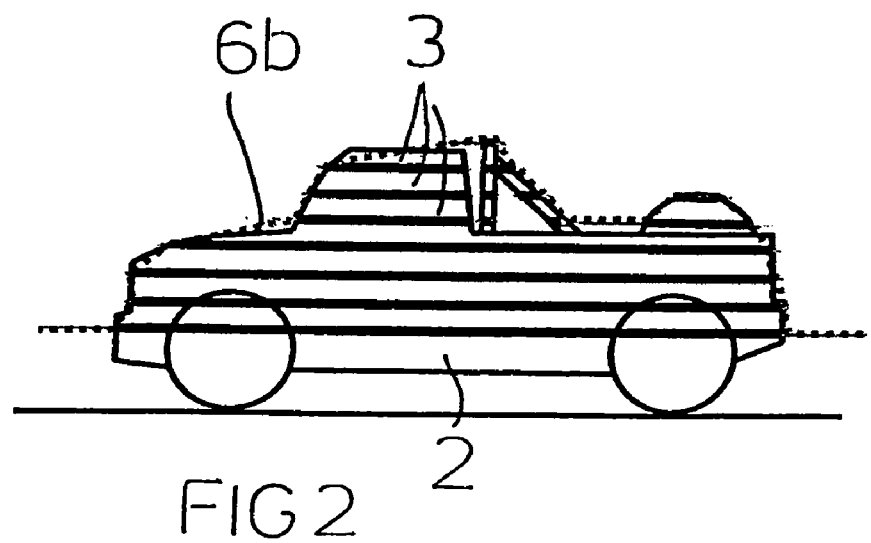
FIG. 2 schematically shows a vehicle profile detection system with a photocells barrier according to a second embodiment of the invention.

Referring to FIG. 2, the detection of the profile 3 of the vehicle 2 to be washed is obtained through reading by means of the photocells barrier which though involving the addition of other devices, it adds various advantages among which: enhancing the accuracy and the fact that it is capable of reading without the obligation of performing a determined process before the passage of the brush. Additionally, if the group of photocells is mounted ahead with respect to the brush, the detection can be performed in the same washing pass. In case of double rollover units the battery of photocells can be mounted on the drying rollover in order to have the possibility of copying in the first pass in almost all the configurations of washing cycles.

In both abovementioned cases, the profile 3 obtained from the reading is corrected mathematically to create a corrected profile 6a and 6b respectively of the vehicle (indicated by the dashed line).

Figure 3:
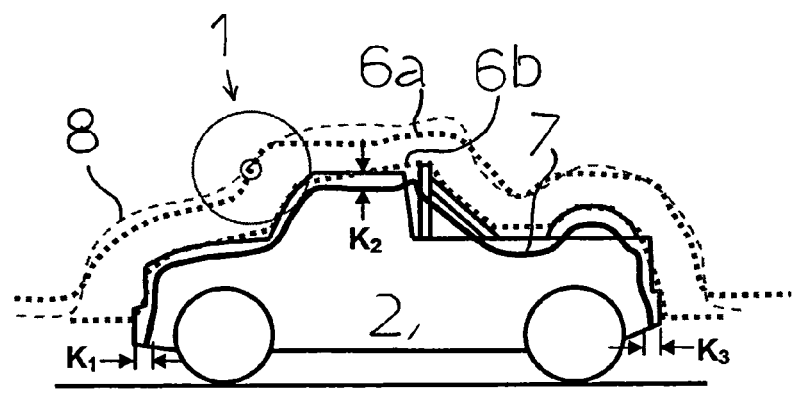
FIG. 3 shows the generation of the gauge profile of the vehicle to be washed, according to the present invention.

Illustrated in FIG. 3 is the creation of the gauge profile 7. The corrected profile of the vehicle 6a (FIG. 1) or 6b (FIG. 2) must be calculated mathematically to obtain the gauge profile 7.

The algorithms processed by the control unit also provide for the processing of a series of parameters (K1, K2, K3 in FIG. 3) which allow to adjust the tolerable plunge limits afterwards depending on the type of bristles or other conditions. Should the reading of the profile be performed by means of a photocells barrier, in the same travel and immediately before the arrival of the brush 1, provided for is an algorithm which calculates the gauge profile 7 in real time for each section detected; such system can be used in any type of programme.

FIG. 3 also illustrates the movement trajectory 8 of the brush 1.

Figure 4:
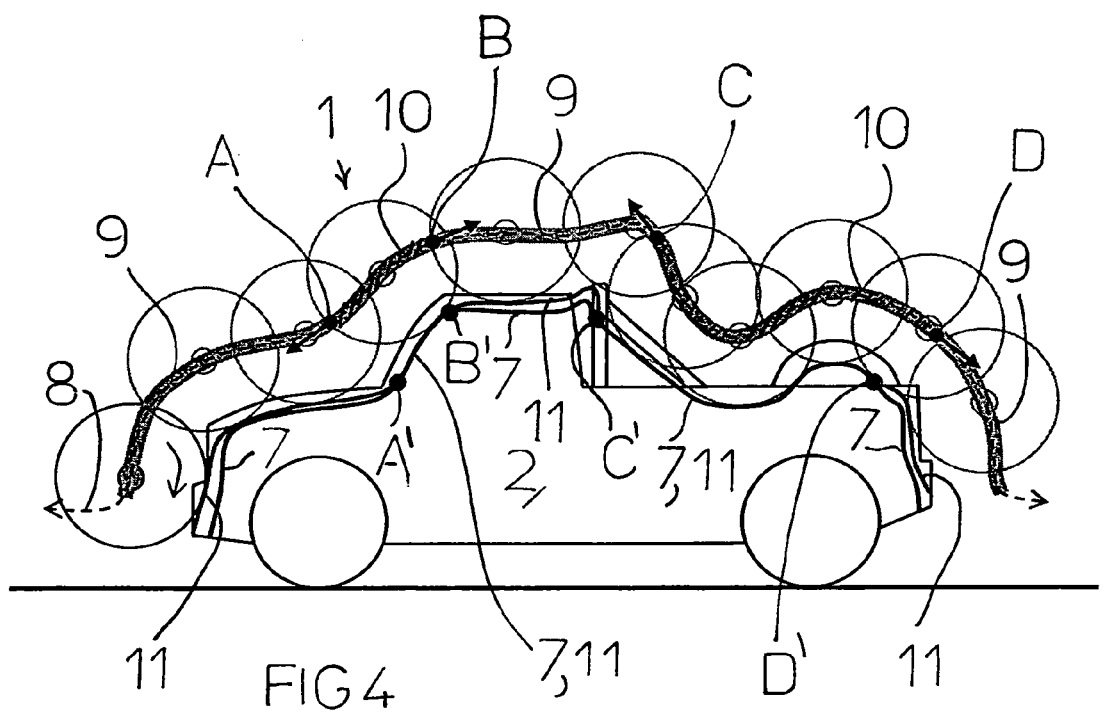
FIG. 4 shows the operation of the alternating control for current absorption and with limitation of the brush plunge, according to the present invention.

The subsequent FIG. 4 shows the development of a pass of the horizontal brush 1 with the double control; it should be observed that both the directions of movement are represented.

The plunge obtained is indicated by the line 11.

The movement trajectory 8 of the brush 1 is divided by points A, B, C, D (to which points A', B', C', D' correspond on the gauge profile 7) into segments 9 in which the first control mode operates and segments 10 in which the second control mode operates.

In the trajectory 8 segments 10 of the brush 1 in which the second control mode operates the plunge curve 11 and the gauge profile 7 practically coincide.

According to an advantageous aspect of the present invention, it is preferable to calculate, during the second control mode, the inclination value of the profile of the vehicle (indicated by arrows in FIG. 4) and then transfer it to the vector control during the first control mode in order to obtain the initial value indispensable to guarantee a smooth switching without discontinuity.

Given that the gauge profile of the vehicle is known, the inclination of the surface can be calculated geometrically at all points and this information can be transferred to the vector control of the first control mode which can provide for the profile in a quicker manner (always maintaining the inclination calculated from the variation in the absorption current as the reference), thus becoming more sensitive and accurate in the control.

A further advantageous aspect of the present invention, is a result of the following consideration: among the vehicles available in the market there will always be a share of them having profiles or particular elements on their bodyworks. Therefore, there shall always be the need to apply forces—manual or automatic—on the movement of the brushes in such a manner to allow avoiding potential drawbacks.

The mirrors on the rear windscreen of certain vans, special wipers (generally rear), certain fixed antennas, loosely fixed lights, bicycle carriers, ladders etc, are examples of these situations.

Advantageously, the forced movements can be generated by modifying the calculated gauge profile geometrically.

Up to date, on the contrary, the brush (which cannot be detached from the bodywork) could only be "lightened" or the movements could be generated as backwards movements or lifting movements without matching the actual profile of the vehicle.

In conclusion, with the aim of maintaining all the advantages of controlling the absorption current but avoiding the critical situations caused by lack of sufficient contact surface, the present invention introduces a new concept consisting in the geometric limitation of the plunge on the entire profile covered by the brush, with the limitation of the plunge provided through constant control of the position of the brush with respect to the gauge profile calculated starting from a profile detected previously.

From a more general point of view, it can be argued that with the new double control system, various problems can be tackled depending on their nature; that is those referring to the quality of the bodywork/bristles contact shall concern the first control mode, while on the contrary, those involving the plunge and movement limits without contact shall regard the second control mode.

The control of the brush according to the present invention is advantageously applicable for washing all types of vehicles (according to the classification: cars, pick-ups and vehicles with special accessories) without requiring the selection of a specific programme. All this is achieved still maintaining all the vector control characteristics due to the control of the absorption current, that is the smoothness, accuracy and quickness of the washing operation.

The method for controlling the horizontal brush of an automatic washing system thus conceived is susceptible to various modifications and variants all falling within the invention concept. Furthermore, all the details can be replaced by technically equivalent elements.

The invention claimed is:

1. A method for controlling the movement of a horizontal brush of a vehicle washing system, said method including the steps of:

providing a first and a second vector velocity control mode of said brush;

providing an alternating logic between said first and second vector velocity control mode, wherein said first vector velocity control mode is based on the control of the absorption current of the rotation motor of said brush and said second control mode being based on the geometric limitation of the position of said brush wherein said second control mode provides for acquiring the profile of the vehicle to be washed and, starting from the acquired profile of the vehicle, processing in real time a gauge profile for the geometric limitation of the position of said brush on said vehicle over the entire profile covered by said brush;

calculating, starting from said acquired profile of the vehicle, the inclination value of said profile of the vehicle during said second control mode, to be used during said first control mode in order to obtain an initial value indispensable to guarantee smooth switching between said first and second control modes without discontinuity; and generating a forced movement of said brush by geometrically modifying said calculated gauge profile.

2. A method for controlling the movement of the horizontal brush of a vehicle washing system according to claim 1, wherein said alternating logic provides switching from said first control mode to said second control mode when said position exceeds said gauge profile, and switching from said second control mode to said first control mode when said absorption current reaches a minimum threshold value wherein during a control section of said first control mode, the position of the brush is verified by a control unit with respect to the gauge profile and during a control section of said second control mode, the current absorption current value is checked by said control unit.

3. A method for controlling the movement of the horizontal brush of a vehicle washing system according to claim 1, wherein said acquiring of said profile of the vehicle consists in acquiring the profile of the maximum overall longitudinal dimension of the vehicle considering the entire width of the vehicle itself.

4. A method for controlling the movement of the horizontal brush of a vehicle washing system according to claim 1, wherein said acquiring of said profile of the vehicle is performed by means of pairs of photocells arranged horizontally on both sides of said washing system.

5. A method for controlling the movement of the horizontal brush of a vehicle washing system according to claim 1, including the additional step of calculating, starting from said acquired profile of the vehicle, the inclination value of said profile of the vehicle at all its points to be used in said first control mode to enhance the control sensitivity in said first control mode.

6. A method for controlling the movement of the horizontal brush of a vehicle washing system according to claim 2, wherein said acquiring of said profile of the vehicle consists in the step of acquiring the profile of the maximum overall longitudinal dimension of the vehicle considering the entire width of the vehicle itself.

7. A method for controlling the movement of the horizontal brush of a vehicle washing system according to claim 2, wherein said acquiring of said profile of the vehicle is performed by means of pairs of photocells arranged horizontally on both sides of said washing system.

8. A method for controlling the movement of the horizontal brush of a vehicle washing system according to claim 3, wherein said acquisition of said profile of the vehicle is performed by means of pairs of photocells arranged horizontally on both sides of said washing system.

9. A method for controlling the movement of the horizontal brush of a vehicle washing system according to claim 2, comprising the additional step of calculating, starting from said acquired profile of the vehicle, the inclination value of said profile of the vehicle at all its points to be used in said first control mode to enhance the control sensitivity in said first control mode.

10. A method for controlling the movement of the horizontal brush of a vehicle washing system according to claim 3, comprising the additional step of calculating, starting from said acquired profile of the vehicle, the inclination value of said profile of the vehicle at all its points to be used in said first control mode to enhance the control sensitivity in said first control mode.

11. A method for controlling the movement of the horizontal brush of a vehicle washing system according to claim 4, comprising the additional step of calculating, starting from said acquired profile of the vehicle, the inclination value of said profile of the vehicle at all its points to be used in said first control mode to enhance the control sensitivity in said first control mode.

* * * * *